(12) United States Patent
Sato et al.

(10) Patent No.: US 11,242,086 B2
(45) Date of Patent: Feb. 8, 2022

(54) VEHICLE STEERING DEVICE

(71) Applicant: Hitachi Astemo, Ltd., Hitachinaka (JP)

(72) Inventors: Yukinari Sato, Tochigi (JP); Takayuki Tetsuka, Tochigi (JP); Shingo Ishige, Tochigi (JP); Akira Shirakawa, Tochigi (JP); Tsukasa Suzuki, Tochigi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 115 days.

(21) Appl. No.: 16/611,439

(22) PCT Filed: Jun. 29, 2017

(86) PCT No.: PCT/JP2017/023865
§ 371 (c)(1),
(2) Date: Nov. 6, 2019

(87) PCT Pub. No.: WO2019/003369
PCT Pub. Date: Jan. 3, 2019

(65) Prior Publication Data
US 2021/0061346 A1 Mar. 4, 2021

(51) Int. Cl.
*B62D 5/04* (2006.01)
*F16C 27/02* (2006.01)
*F16F 15/08* (2006.01)

(52) U.S. Cl.
CPC ......... *B62D 5/0448* (2013.01); *B62D 5/0421* (2013.01); *F16C 27/02* (2013.01); *F16F 15/08* (2013.01)

(58) Field of Classification Search
CPC ..... B62D 5/0448; B62D 5/0421; F16C 27/02; F16F 15/08
See application file for complete search history.

(56) References Cited

U.S. PATENT DOCUMENTS 8,899,373 B2   12/2014  Rupp et al.
9,290,199 B2 *  3/2016  Bando ................. B62D 5/0448
(Continued)

FOREIGN PATENT DOCUMENTS

JP   2008208917 A  *  9/2008
JP   2013-132988        7/2013
(Continued)

OTHER PUBLICATIONS

International Search Report, dated Aug. 22, 2017 (Aug. 22, 2017), 2 pages.
(Continued)

*Primary Examiner* — Jacob D Knutson
(74) *Attorney, Agent, or Firm* — Rankin, Hill & Clark LLP

(57) ABSTRACT

A vehicle steering device includes a turning shaft held in a housing so as to be movable in the axial direction, a ball screw transmitting drive force produced by an electric motor to the turning shaft, a bearing supporting a nut, which is a component of the ball screw, so as to be rotatable relative to the housing, and annular elastic members that support side faces of the bearing in the axial direction of the turning shaft across the entire circumference, and are formed of an elastic material. The elastic members include respective first elastic portions having a first load characteristic that gently increases the ratio of compression load per a unit compression amount deforming in the axial direction of the turning shaft, and respective second elastic portions having a second load characteristic that keenly increases the ratio in comparison with the first load characteristic.

5 Claims, 5 Drawing Sheets

(56) References Cited

U.S. PATENT DOCUMENTS

| | | | | |
|---|---|---|---|---|
| 9,809,245 B2* | 11/2017 | Laszlo | ................ | B62D 5/0448 |
| 10,717,461 B2* | 7/2020 | Asakura | ............... | B62D 5/0448 |
| 10,889,318 B2* | 1/2021 | Kondo | ................. | F16C 19/184 |
| 2002/0140146 A1* | 10/2002 | Nakagawa | ........... | F16F 1/3814 |
| | | | | 267/141.2 |
| 2013/0161114 A1* | 6/2013 | Bando | .................. | F16C 27/066 |
| | | | | 180/443 |
| 2015/0274194 A1* | 10/2015 | Kimijima | .............. | B62D 3/126 |
| | | | | 280/777 |
| 2018/0346015 A1* | 12/2018 | Tomikawa | ........... | F16H 55/171 |
| 2020/0122772 A1* | 4/2020 | Suzuki | ................. | F16C 19/183 |

FOREIGN PATENT DOCUMENTS

| | | |
|---|---|---|
| JP | 2014-501656 | 1/2014 |
| JP | 2016-056920 | 4/2016 |
| JP | 2016-159668 | 9/2016 |
| JP | 6266182 | 1/2018 |
| WO | 2012/065868 | 5/2012 |

OTHER PUBLICATIONS

Japanese Decision to Grant a Patent, dated Dec. 1, 2017, English text, 2 pages.
Japanese Notice of Reasons for Refusal, dated Aug. 15, 2017, English text, 2 pages.
Written Opinion, dated Oct. 19, 2017, English text, 7 pages.

* cited by examiner

VEHICLE STEERING DEVICE

TECHNICAL FIELD

The present disclosure relates to a vehicle steering device that includes a ball screw.

BACKGROUND ART

Some vehicle steering devices are so-called electric power steering devices which transmit drive force produced by an electric motor to a turning shaft (e.g., a rack shaft) by a ball screw. Movement of the turning shaft in the axial direction enables wheels to turn to the right or left. Such a vehicle steering device is disclosed in, for example, Patent Document 1.

The vehicle steering device disclosed in Patent Document 1 includes a ball screw that transmits drive force produced by an electric motor to a turning shaft, and a bearing that supports, to a housing, a nut which is a component of the ball screw so as to be freely rotatable. A side face of the bearing is supported (i.e., a so-called floating support) by a damping component in the axial direction of the turning shaft. The damping component includes a collar and an elastic member formed of rubber. The collar and the elastic member are an annular component mutually combined with each other in the axial direction of the turning shaft. The elastic member has a rectangular cross-sectional shape. Hence, a load characteristic of the elastic member, i.e., a ratio (spring rate) of a compression load per a unit compression amount deforming in the axial direction of the turning shaft is substantially constant.

In general, when a vehicle is normally running, the ball screw may produce vibration and operating noise due to misalignment. Such vibration and operating noise are transmitted from the nut to the bearing. The vibration and operating noise are attenuated by the damping component. Moreover, a tiny inclination may occur to the bearing due to non-uniform load acting on the nut of the ball screw. When the bearing is inclined, vibration and operating noise are produced between an outer circumference of the bearing and an inner circumference of the housing that supports the bearing. The damping component suppresses the inclination of the bearing, thereby suppressing the vibration and operating noise.

CITATION LIST

Patent Literatures

Patent Document 1: JP 2016-159668 A

SUMMARY OF INVENTION

Technical Problem

For example, when a wheel goes over a curb of a road, shock load in the axial direction acts on the turning shaft from the wheel. Such shock load in the axial direction is transmitted from the turning shaft to the bearing via the nut of the ball screw. When the bearing that has received excessive shock load is displaced greatly in the axial direction relative to the housing, the elastic member is completely collapsed. At this time, when the bearing hits the collar, hitting noise is produced. In order to further advance a noise reduction in a vehicle interior, it is desired to suppress the hitting noise as much as possible. For this reason, it is preferable to enhance a so-called retaining ability that retains the position of the bearing relative to the housing.

An objective of the present disclosure is to provide a technology that can accomplish both the reduction of vibration and operating noise from a bearing when a vehicle is normally running, and the retaining ability for the position of the bearing when excessive shock load in an axial direction is applied to a turning shaft.

Solution to Problem

A vehicle steering device according to the present disclosure includes:

a turning shaft held in a housing so as to be movable in an axial direction;

a ball screw that transmits drive force produced by an electric motor to the turning shaft;

a bearing that supports a nut which is a component of the ball screw so as to be rotatable relative to the housing; and an annular elastic member which includes: a first elastic portion that has a first load characteristic that gently increases a ratio of compression load per a unit compression amount deforming in the axial direction of the turning shaft; and a second elastic portion that has a second load characteristic that keenly increases the ratio in comparison with the first load characteristic, supports a side face of the bearing in the axial direction of the turning shaft across the entire circumference, and is formed of an elastic material.

Preferably, the second elastic portion is an annular member in a circular disk shape in parallel with the side face of the bearing, and includes a flat tip surface that faces the side face of the bearing, the first elastic portion is an annular member protruding toward the side face of the bearing from the tip surface of the second elastic portion, a cross-sectional shape of the first elastic portion is in a tapered shape that is tapered toward the side face of the bearing from the tip surface of the second elastic portion, an outer diameter of the first elastic portion is smaller than an outer diameter of the second elastic portion; and an internal diameter of the first elastic portion is larger than an internal diameter of the second elastic portion.

Preferably, an inner circumference of the second elastic portion is an inclined surface continuous from an inner circumference of the first elastic portion.

Preferably, a tip surface of the first elastic portion faces the side face of the bearing, and have a circular arc shape in a cross-sectional view.

Preferably, the above vehicle steering device further includes an annular collar that is provided between the housing and the elastic member in the axial direction of the turning shaft, wherein the elastic member is formed integrally with the collar.

Preferably, the collar includes an annular recess in a tip surface that faces the side face of the hearing, the second elastic portion is fitted in the recess, the internal diameter of the second elastic portion is consistent with an internal diameter of the collar, and the tip surface of the second elastic portion protrudes toward the side face beyond the tip surface of the collar.

Advantageous Effects of Invention

According to the present disclosure, the elastic member that supports the side face of the bearing in the axial direction is a product formed of an elastic material that includes the first elastic portion with the first load characteristic, and the second elastic portion with the second load characteristic. The first load characteristic gently increases a ratio of compression load (spring rate) per a unit compression amount deforming in the axial direction of the turning shaft 26. The second load characteristic keenly increases the ratio in comparison with the first load characteristic. As described above, the elastic member has a spring rate in two stages.

Vibration and operating noise due to a displacement of the bearing in the axial direction originating from misalignment of the ball screw and non-uniform load acting on the nut of the ball screw can be reduced by, in particular, the first elastic portion of the elastic member.

Moreover, shock load acting on the bearing in the axial direction can be attenuated by, in particular, the second elastic portion of the elastic member. Consequently, the ball screw and the bearing can be protected against the shock load. In addition, the position of the bearing relative to the housing in the axial direction can be held by the second elastic portion. Consequently, hitting noise production can be prevented.

As described above, the spring rate in two stages accomplishes both the reduction of vibration and operating noise of the bearing when the vehicle is normally running, and the retaining ability of the position of the bearing when excessive shock load in the axial direction is applied to the turning shaft.

Moreover, since the elastic member is formed of an elastic material, a degree of freedom for the shape thereof is high. Hence, the elastic member can be formed in such a way that both the first load characteristic and the second load characteristic are optimized. That is, since an elastic material is adopted as the elastic member, in comparison with a case in which a spring like disc spring is adopted, optimal setting of the load characteristic is easy.

DESCRIPTION OF EMBODIMENTS

An embodiment to carry out the present disclosure will be described below with reference to the accompanying drawings.

Figure 1:
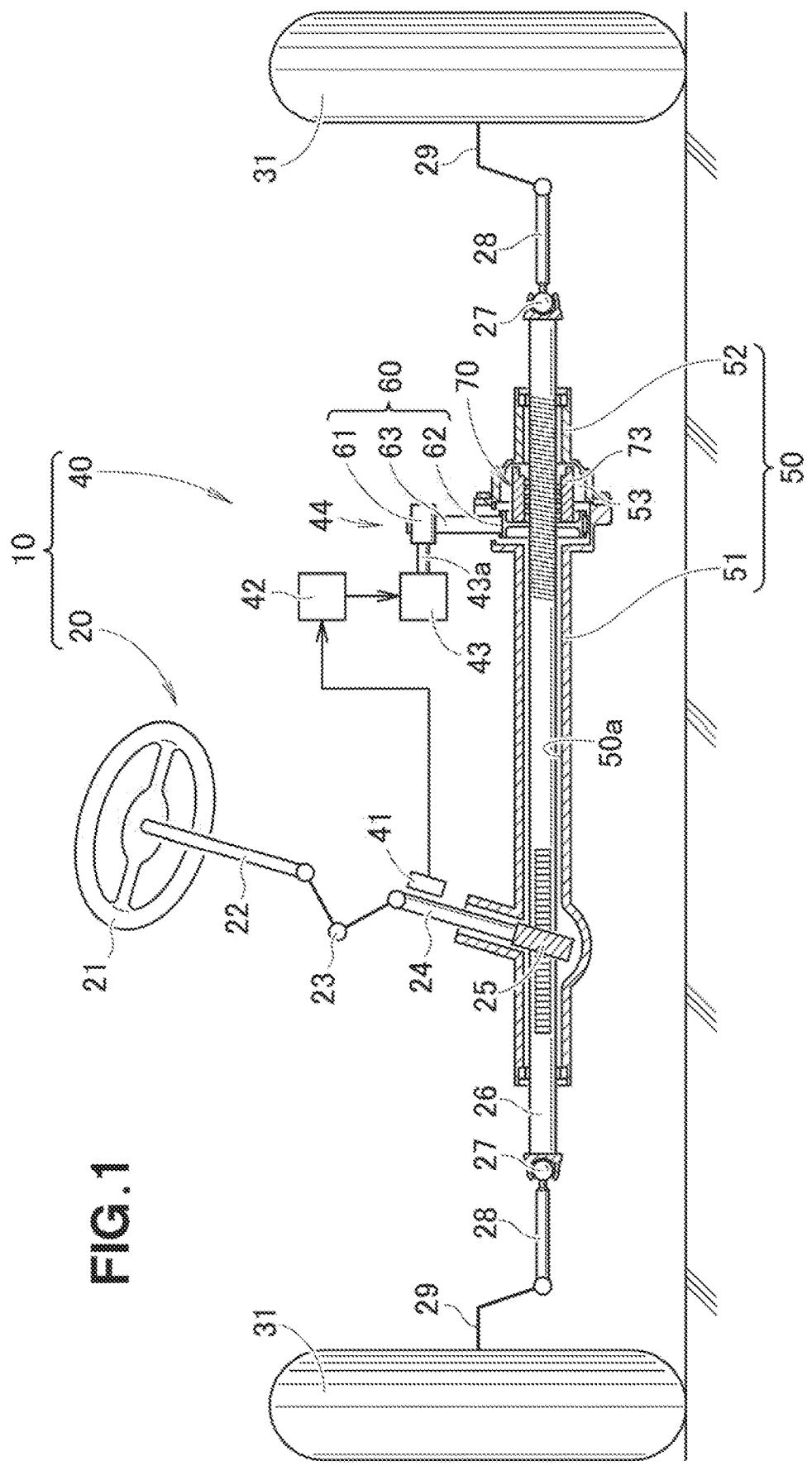
FIG. 1 is an exemplarily diagram, of a vehicle steering device according to the present disclosure.

As illustrated in FIG. 1, a vehicle steering device 10 includes a steering system 20 from a steering wheel 21 of a vehicle to wheels 31 and 31 (turning wheels 31 and 31), and an auxiliary torque mechanism 40 that applies auxiliary torque to the steering system 20.

The steering system 20 includes a steering wheel 21, a steering shaft 22 connected to the steering wheel 21, an input shaft 24 connected to the steering shaft 22 via a universal joint 23, s turning shaft 26 connected to the input shaft 24 by a first transmission mechanism 25, and the right and left (both sides in a vehicle widthwise direction) wheels 31 and 31 respectively connected to both ends of the turning shaft 26 via respective ball joints 27 and 27, respective tie rods 28 and 28, and respective knuckles 29 and 29.

The first transmission mechanism 25 is, for example, a rack and pinion mechanism. The turning shaft 26 is movable in the axial direction (the vehicle widthwise direction).

According to the steering system 20, when a driver turns the steering wheel 21, the right and left wheels 31 and 31 can be turned by steering torque through the first transmission mechanism 25, the turning shaft 26, and the tie rods 28 and 28.

The auxiliary torque mechanism 40 includes a steering torque sensor 41, a control unit 42, an electric motor 43, and a second transmission mechanism 44. The steering torque sensor 41 detects steering torque of the steering system 20 applied to the steering wheel 21. The control unit 42 generates a control signal based on a torque detection signal by the steering torque sensor 41. The electric motor 43 produces motor torque (auxiliary torque), i.e., drive force in accordance with the steering torque based on the control signal by the control unit 42. The second transmission mechanism 44 transmits the auxiliary torque produced by the electric motor 43 to the turning shaft 26.

According to this vehicle steering device 10, the wheels 31 and 31 can be turned via the turning shaft 26 by combination torque that is obtained by adding the auxiliary torque by the electric motor 43 to the driver's steering torque.

The first transmission mechanism 25 is held in a housing 50. The turning shaft 26 is also held in the housing 50 so as to be movable in the vehicle widthwise direction (the axial direction). Both ends of the turning shaft 26 respectively protrude from both ends of the housing 50 in the vehicle widthwise direction. The housing 50 is elongated in the vehicle widthwise direction, and has a through-hole 50a that passes completely through the housing in the vehicle widthwise direction.

Figure 2:
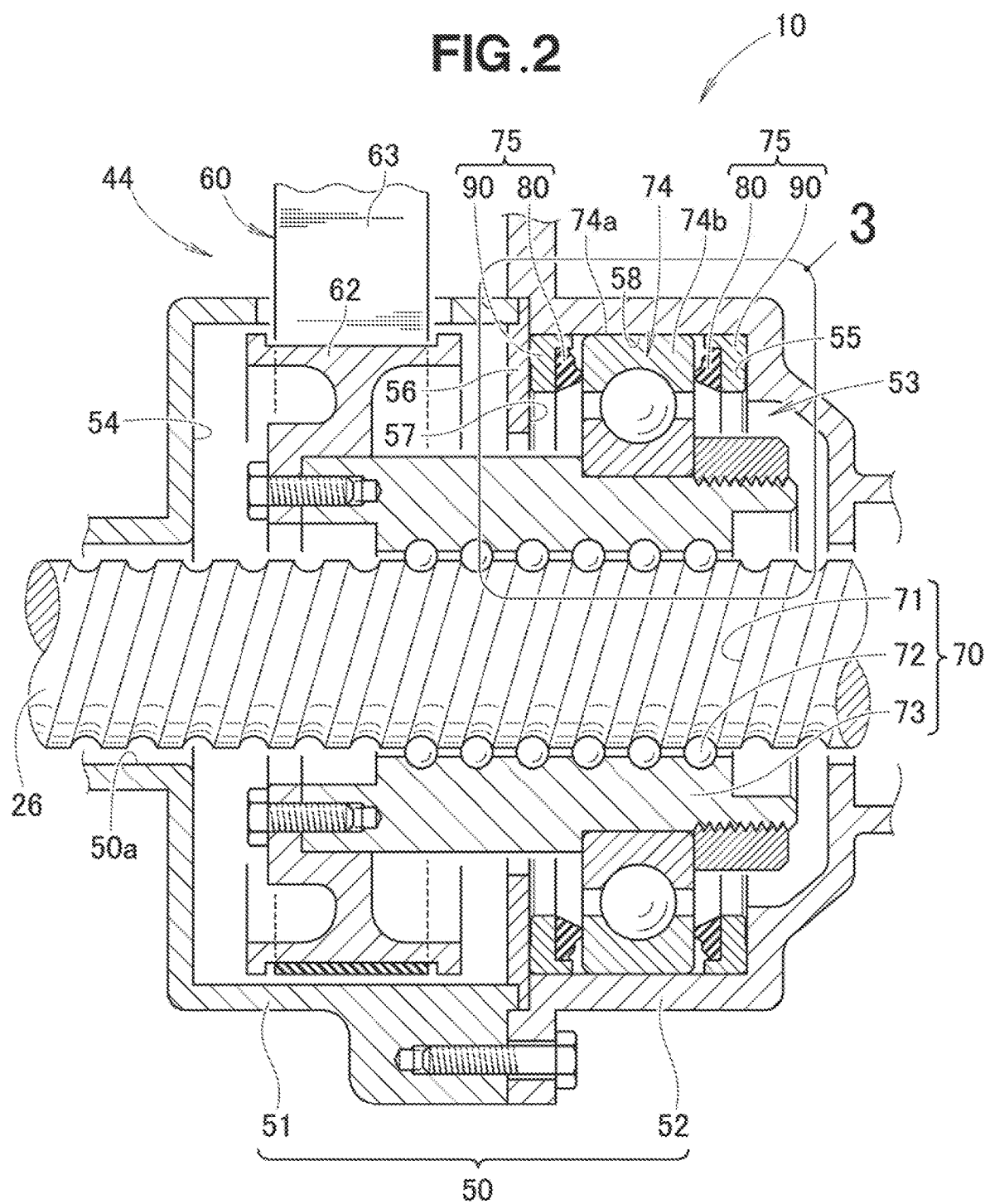
FIG. 2 is a cross-sectional view around a second transmission mechanism illustrated in FIG. 1.

The housing 50 will be described in detail. As illustrated in FIGS. 1 and 2, the housing 50 is divided into two pieces in the vehicle widthwise direction which are a first housing half-body 51 and a second housing half-body 52, and those half-bodies are integrated with each other by bolt coupling.

Moreover, as illustrated in FIG. 2, the housing 50 includes a retaining room 53 at the coupling portion between the first housing half-body 51 and the second housing half-body 52. In the housing 50, a first wall surface 54 and a second wall surface 55 that respectively form both end faces of the retaining room 53 in the vehicle widthwise direction are each a flat surface orthogonal to the turning shaft 26. The first housing half-body 51 has the first end face 54. The second housing half-body 52 has the second end face 55. A hollow circular disk 56 that is freely attachable and detachable is provided in the retaining room 53 in the halfway in the vehicle widthwise direction. This circular disk 56 includes a flat side face 57 which faces the second end face 55 and which is in parallel therewith. This side face 57 will be referred to as a third end face 57 below.

As illustrated in FIGS. 1 and 2, the second transmission mechanism 44 is retained in the retaining room 53. The second transmission mechanism 44 includes, for example, a belt-driven type mechanism 60 and a ball screw 70. The belt-driven type mechanism 60 includes a drive pulley 61 provided at an output shaft 43a of the electric motor 43, a follower pulley 62 provided at a nut 73 of the ball screw 70, and a belt 63 tensioned between the drive pulley 61 and the follower pulley 62.

Figure 3:
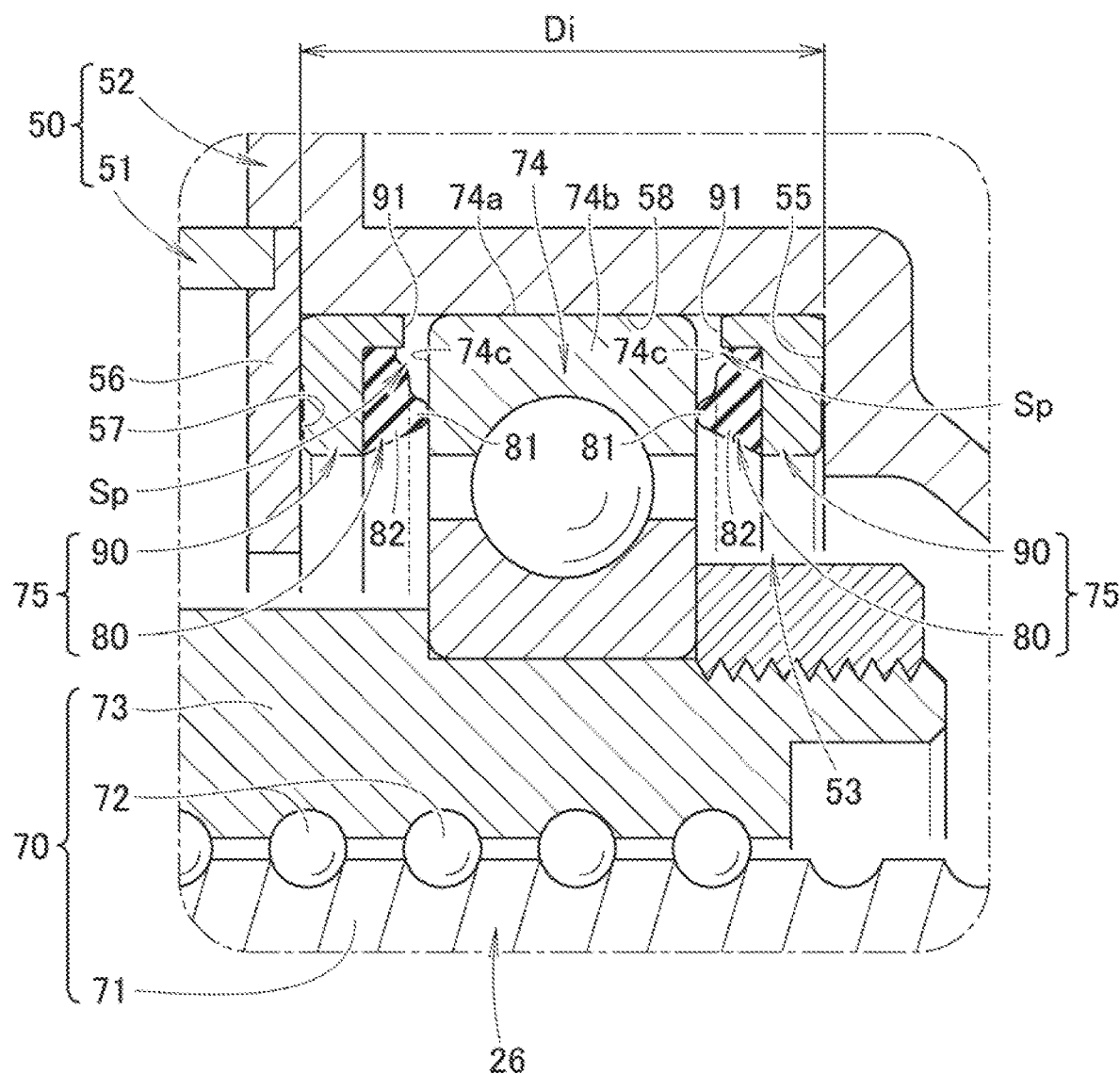
FIG. 3 is an enlarged view of a section 3 in FIG. 2.

As illustrated in FIGS. 2 and 3, the ball screw 70 is a kind of a conversion mechanism that converts rotation motion into linear motion, and transmits the drive force produced by the electric motor 43 (see FIG. 1), i.e., the auxiliary torque, to the turning shaft 26. This ball screw 70 includes a screw part 71 (female screw 71) formed on the turning shaft 26, a plurality of balls 72, and the nut 73 coupled to the screw part 71 via the plurality of balls 72.

The nut 73 is supported by a bearing 74 so as to be freely rotatable relative to the housing 50, and has a restricted relative movement to the bearing 74 in the axial direction. The bearing 74 is located between the second end face 55 and the third end face 57 in the retaining room 53, an is engaged with an inner circumference 58 of the retaining room 53. A quite small clearance is provided between the inner circumference 58 of the retaining room 53 and an outer circumference 74a of the bearing 74. Accordingly, when load in the axial direction acts on the hearing 74, the bearing 74 is movable in the axial direction of the turning shaft 26 relative to the inner circumference 58 of the retaining room 53.

It is preferable that the bearing 74 should be a "rolling bearing", such as a ball bearing or a roller bearing. The bearing 74 will be also referred to as the "rolling bearing 74" as appropriate below. A pair of annular support portions 75 and 75 is respectively located at both sides of an outer race 74b of the rolling bearing 74. The pair of support portions 75 and 75 face with each other across the rolling hearing 74 in the axial direction of the turning shaft 26. As described above, provided between the second end face 55 and the third end face 57 in the retaining room 53 are the rolling bearing 74 and the pair of support portions 75 and 75. Side faces 74c and 74c of the outer race 74b of the rolling bearing 74 are supported across the entire circumference by the pair of annular support portions 75 and 75 with elasticity (i.e., a so-called floating support) in the axial direction of the turning shaft 26. Consequently, the nut 73 is indirectly supported by the bearing 74 in the axial direction of the turning shaft 26 with elasticity.

Figure 4:
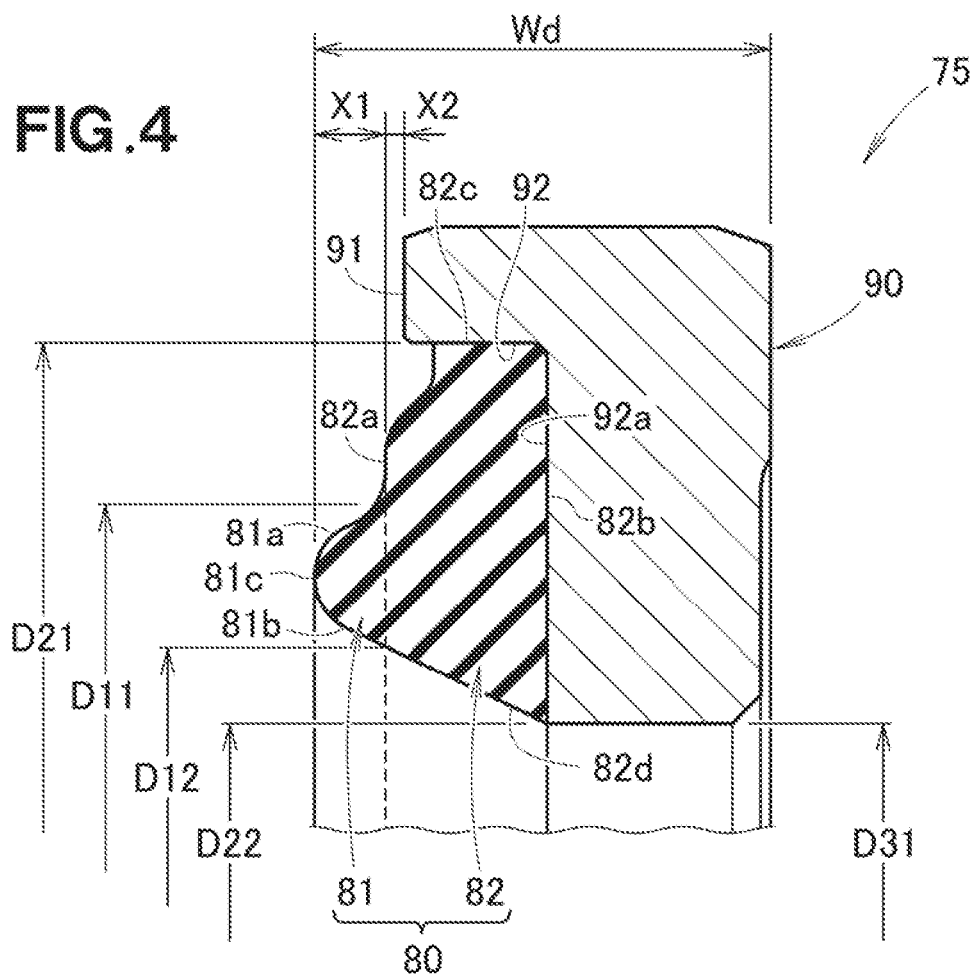
FIG. 4 is an enlarged view of a support portion illustrated in FIG. 3.

The one support portion 75 will be described below on behalf of the pair of support portions 75 and 75. As illustrated in FIGS. 3 and 4, this support portion 75 includes an annular elastic member 80, and an annular collar 90 that supports the elastic member 80. The elastic member 80 and the collar 90 are combined with each other, and are integrated with each other in the axial direction of the turning shaft 26.

The elastic member 80 is formed of an elastic material. Example elastic materials that form the elastic member 80 are a single rubber body, a single resin body, a combination of a rubber and a resin, and a two-color molded component of a rubber and a resin. The elastic member 80 includes an annular first elastic portion 81 and an annular second elastic portion 82, and those are integrated with each other.

The first elastic portion 81 has a "first load characteristic" that gently increases a ratio of compression load per a unit compression amount deforming in the axial direction of the turning shaft 26, i.e., the spring rate. According to such a first load characteristic, it is preferable that a change in the spring rate should approximate linearity. Moreover, the maximum value of the spring rate in the first load characteristic is set to be small so as to be able to reduce vibration of the bearing 74 in the axial direction of the turning shaft 26.

The second elastic portion 82 has a "second load characteristic" that keenly increase the ratio of compression load (spring rate) per a unit compression amount in comparison with the first load characteristic.

The elastic member 80 achieves the first load characteristic and the second load characteristic by having a difference in a cross-sectional shape of the first elastic portion 81 and that of the second elastic portion 82.

Figure 5:
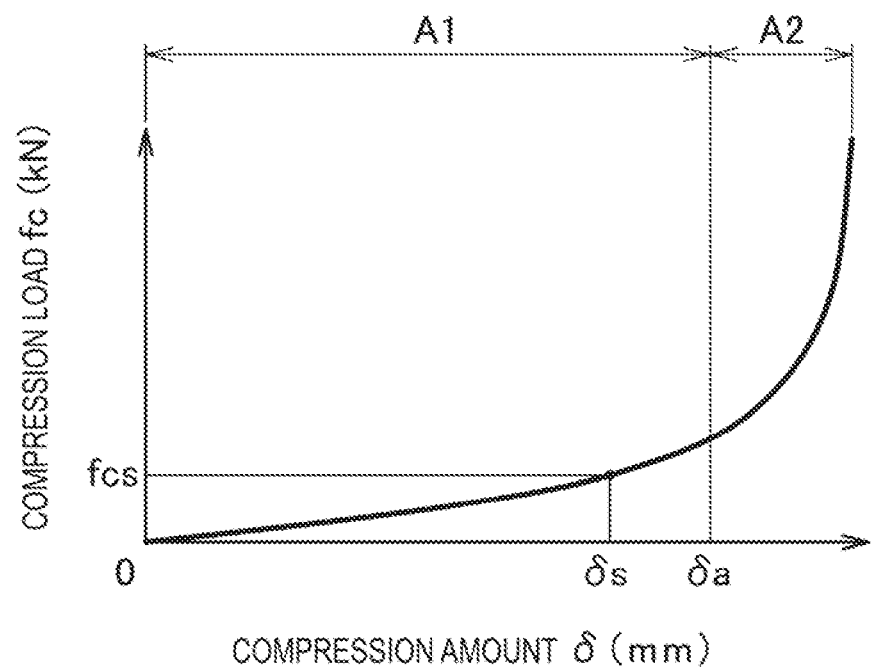
FIG. 5 is a compression load/compression amount curve diagram for an elastic member illustrated in FIG. 4.

The load characteristic of the elastic member 80 will be described with reference to FIG. 5. FIG. 5 is a compression load/compression amount curve diagram of the elastic member 80, and indicates the characteristic of a compression amount $\delta$, i.e., a load characteristic of the elastic member 80 relative to the compression load, with a vertical axis representing input compression load fc to the elastic member 80 and a horizontal axis representing the compression amount $\delta$ of the elastic member 80. A range A1 of the compression amount from the origin to a preset reference compression amount $\delta a$ will be referred to a first range A1. A subsequent range A2 of the compression amount to the first range A1 will be referred to as a second range A2.

The characteristics of the elastic member 80 involve the first load characteristic in which "the spring rate is small" and "the spring rate gently increases within the first range A1, and the second load characteristic in which "the spring rate keenly increases" within the second range A2. In the first load characteristic, a change in the spring rate approximates linearly, and the spring rate at the reference compression amount $\delta a$ becomes the maximum. As described above, the characteristics of the elastic member 80 have the spring rate in two stages. According to the present disclosure, an initial value $\delta s$ of the compression amount $\delta$ is set to be near the reference compression amount $\delta a$, i.e., to be small in the first range A1.

As illustrated in FIG. 3 and FIG. 4, the second elastic portion 82 includes an annular (hollow disk shape) member that is in parallel with the side face 74c of the rolling bearing 74. The cross-sectional shape of the second elastic portion 82 is in a substantially rectangular shape. The second elastic portion 82 includes a flat tip surface 82a (a surface 82a) that faces the side face 74c of the rolling bearing 74, and a flat back surface 82b that faces the collar 90. The second elastic portion 82 has a uniform thickness (in the axial direction of the turning shaft 26).

The first elastic portion 81 is an annular member that protrudes by a protrusion amount X1 toward the side face 74c of the rolling bearing 74 from the flat tip surface 82a of the second elastic portion 82. The cross-sectional shape of the first elastic portion 81 is a tapered shape that is tapered toward the side face 74c of the rolling bearing 74 from the tip surface 82a of the second elastic portion 82. That is, both the outer circumference 81a and the inner circumference 81b of the first elastic portion 81 are inclined surfaces. The tip surface 81c of the first elastic portion 81 is formed in a circular arc shape in a cross-sectional view.

The outer circumference 82c of the second elastic portion 82 is in a circular shape. The inner circumference 82d of the second elastic portion 82 is an inclined surface continuous from the inner circumference 81b of the first elastic portion 81. An outer diameter D11 of the first elastic portion 81 is smaller than an outer diameter D21 of the second elastic portion 82. An internal diameter D12 of the first elastic portion 81 is larger than an internal diameter D22 of the second elastic portion 82.

The collar 90 is located between either one of the second end face 55 or the third end face 57 and the elastic member 80. This collar 90 is an annular (hollow disk) member formed of a metal or a hard resin. A tip surface 91 of the collar 90 faces the side face 74c of the rolling bearing 74. An annular recess 92 is formed in the tip surface 91. A bottom surface 92a of the recess 92 is a flat surface. The second elastic portion 82 is fitted in the recess 92. An internal diameter D31 of the collar 90 is consistent with the internal diameter D22 of the second elastic portion 82. The tip surface 82a of the second elastic portion 82 protrudes from the tip surface 91 of the collar 90 by a protrusion amount X2.

Next, an action of the pair of support portions 75 and 75 will be described. As illustrated in FIG. 3, the rolling bearing 74 is held between the pair of support portions 75 and 75 in the axial direction of the turning shaft 26, and is located between the second end face 55 and the third end face 57.

An apart dimension D1 (see FIG. 3) between the second end face 55 and the third end face 57 is designed to be smaller than the total of the width of the rolling bearing 74 and respective widths Wd and Wd (see FIG. 4) of the pair of support portions 75 and 75. Hence, in an initial state in which no force in the axial direction is acting on the nut 73, the first elastic portions 81 and 81 are already compressed by a constant compression amount (initial setting). This constant compression amount corresponds to the initial value δs of the compression amount δ illustrated in FIG. 5, and is set within the first range A1. Consequently, an initial compression load fcs (preload) corresponding to the initial value δs is applied to each side face 74c and 74c of the rolling bearing 74. In the initial state, as illustrated in FIG. 3, certain clearances Sp and Sp are provided in the axial direction of the turning shaft 26 between the respective side faces 74c and 74c of the rolling bearing 74 and the respective tip surfaces 91 and 91 of the collars 90 and 90.

Tiny force (including vibration) in the axial direction acting on the nut 73 and on the rolling bearing 74 is attenuated by the first elastic portions 81 and 81. Large force in the axial direction acting on the nut 73 and on the rolling bearing 74 are attenuated by the second elastic portions 82 and 82.

The above-described details are summarized as follows.

As illustrated in FIGS. 2 and 3, the vehicle steering device 10 includes:

the turning shaft 26 held in the housing 50 so as to be movable in the axial direction;

the ball screw 70 that transmits drive force produced by the electric motor 43 (see FIG. 1) to the turning shaft 26;

the bearing 74 that supports the nut 73 which is a component of the ball screw 70 so as to be rotatable relative to the housing 50; and the annular elastic members 80 and 80 which include: the respective first elastic portions 81 and 81 which have the first load characteristic that gently increases the ratio of compression load per a unit compression amount deforming in the axial direction of the turning shaft 26; and the respective second elastic portions 82 and 82 which have the second load characteristic that keenly increases the ratio in comparison with the first load characteristic, support the side faces 74c and 74c of the bearing 74 in the axial direction of the turning shaft across the entire circumference, and are formed of an elastic material.

As described above, the elastic members 80 and 80 include the respective first elastic portions 81 and 81 that have the first load characteristic and the respective second elastic portions 82 and 82 that have the second load characteristic, thus accomplishing the spring rate in two stages.

Vibration and operating noise due to a displacement of the bearing 74 in the axial direction originating from misalignment of the ball screw 70 and non-uniform load acting on the nut 73 of the ball screw 70 can be reduced by, in particular, the respective first elastic portions 81 and 81 of the elastic members 80 and 80.

Moreover, shock load acting on the bearing 74 in the axial direction can be attenuated by, in particular, the respective second elastic portions 82 and 82 of the elastic members 80 and 80. Consequently, the ball screw 70 and the bearing 74 can be protected against the shock load. In addition, the position of the bearing 74 relative to the housing 50 in the axial direction can be held by the second elastic portions 82 and 82. Consequently, hitting noise production can be prevented.

As described above, the spring rate in two stages accomplishes both the reduction of vibration and operating noise of the bearing 74 when the vehicle is normally running, and the retaining ability of the position of the bearing 74 when excessive shock load in the axial direction is applied to the turning shaft 26.

Moreover, since the elastic members 80 and 80 are each formed of an elastic material, a degree of freedom for the shape thereof is high. Hence, the elastic members 80 and 80 can be formed in such a way that both the first load characteristic and the second load characteristic are optimized. That is, since an elastic material is adopted as the elastic members 80 and 80, in comparison with a case in which a spring like disc spring is adopted, optimal setting of the load characteristic is easy.

Furthermore, as illustrated in FIGS. 3 and 4, the second elastic portions 82 and 82 are annular members in a circular disk shape in parallel with the respective side faces 74c and 74c of the bearing 74, and include the respective flat tip surfaces 82a and 82a that face the respective side faces 74c and 74c of the hearing 74. The first elastic portions 81 and 81 are annular members protruding toward the respective side faces 74c and 74c of the bearing 74 from the respective tip surfaces 82a and 82a of the second elastic portions 82 and 82. The respective cross-sectional shapes of the first elastic portions 81 and 81 are in a tapered shape that is tapered toward the respective side faces 74c and 74c from the respective tip surfaces 82a and 82a of the second elastic portions 82 and 82. The respective outer diameters D11 of the first elastic portions 81 and 81 are smaller than the respective outer diameters of the second elastic portions 82 and 82. The respective internal diameters 12 of the first elastic portions 81 and 81 are larger than the respective internal diameters D22 of the second elastic portions 82 and 82.

As described above, the cross-sectional shapes of the first elastic portions 81 and 81 and the cross-sectional shapes of the second elastic portions 82 and 82 remarkably differ from each other. In addition, the diameters D11 and D12 of the first elastic portions 81 and 81 differ from the diameters D21 and D22 of the second elastic portions 82 and 82. Accordingly, the spring rate can be easily made remarkably different in two stages. Furthermore, since the respective cross-sectional shapes of the first elastic portions 81 and 81 are in a tapered shape, the first load characteristic that gently increases the spring rate can be fully accomplished.

Furthermore, as illustrated in FIGS. 3 and 4, the respective inner circumferences 82d and 82d of the second elastic portions 82 and 82 are inclined surfaces continuous from the respective inner circumferences 81b and 81b of the first elastic portions 81 and 81. Hence, excessive shock load acting on the respective first elastic portions 81 and 81 from the respective side faces 74c and 74c of the bearing 74 can be efficiently transmitted to the respective second elastic portions 82 and 82.

Furthermore, as illustrated in FIGS. 3 and 4, the respective tip surfaces 81c and 81c of the first elastic portions 81 and 81 face the respective side faces 74c and 74c of the bearing 74, and have a circular arc shape in a cross-sectional view. By forming the respective tip surfaces 81c and 81c of the first elastic portions 81 and 81 in a circular arc shape in a cross-sectional view, the durability of the first elastic portions 81 and 81 can be enhanced.

Furthermore, as illustrated in FIGS. 3 and 4, the vehicle steering device 10 further includes the annular collars 90 and 90 that are provided between the housing 50 and the respective elastic members 80 and 80 in the axial direction of the turning shaft 26. The elastic members 80 and 80 are formed integrally with the respective collars 90 and 90.

As described above, since the elastic members 80 and 80 are combined in the respective collars 90 and 90, an appropriate attitude relative to the side faces 74c and 74c of the bearing 74 can be always maintained. Since the collars 90 and 90 are provided between the housing 50 and the respective elastic members 80 and 80, no displacement in the axial direction of the turning shaft 26 occurs within the housing 50. Accordingly, the elastic members 80 and 80 can appropriately support (a so-called floating support) the respective side faces 74c and 74c in the axial direction of the turning shaft 26.

Furthermore, as illustrated in FIGS. 3 and 4, the collars 90 and 90 include the respective annular recesses 92 and 92 in the respective tip surfaces 91 and 91 that face the respective side faces 74c and 74c of the bearing 74. The second elastic portions 82 and 82 are fitted in the respective recesses 92 and 92. The respective internal diameters D22 of the second elastic portions 82 and 82 are consistent with the respective internal diameters D31 of the collars 90 and 90. The respective tip surfaces 82a and 82a of the second elastic portions 82 and 82 protrude toward the respective side faces 74c and 74c beyond the respective tip surfaces 91 and 91 of the collars 90 and 90.

Hence, the respective tip surfaces 91 and 91 of the collars 90 and 90 define a range in which the bearing 74 is displaced in the axial direction. When the bearing 74 that receives excessive shock load is displaced greatly/in the axial direction relative to the housing 50, the elastic members 80 and 80 are completely collapsed. Since the side faces 74c and 74c of the bearing 74 hit the respective tip surfaces 91 and 91 of the collars 90 and 90, the bearing 74 cannot be displaced any more in the axial direction.

Note that the vehicle steering device 10 according to the present disclosure is not limited to the embodiment as long as the action and effect of the present disclosure are achievable.

For example, according to the present disclosure, the vehicle steering device 10 may be a so-called steer-by-wire scheme steering device that adopts a scheme of mechanically separating the steering wheel 21 and the turning shaft 26, causing a steering actuator (unillustrated) to produce steering force in accordance with a turned amount of the steering wheel 21, and transmitting this turning force to the turning shaft 26 via the ball screw 70.

Moreover, the bearing 74 is not limited to a rolling bearing, and for example, a sliding bearing may be adopted.

INDUSTRIAL APPLICABILITY

The vehicle steering device 10 according to the present disclosure is suitable for being provided in an automobile.

REFERENCE SIGNS LIST

10 Vehicle steering device
26 Turning shaft
43 Electric motor
50 Housing
70 Ball screw
73 Nut
74 Bearing
74c Side face of bearing
80 Elastic member
81 First elastic portion
81b Inner circumference
81c Tip surface
82 Second elastic portion
82a Tip surface
82d Inner circumference
90 Collar
91 Tip surface
92 Recess
D11 Outer diameter of first elastic portion
D12 Internal diameter of first elastic portion
D21 Outer diameter of second elastic portion
D22 Internal diameter of second elastic portion
D31 Internal diameter of collar

The invention claimed is:

1. A vehicle steering device comprising:
a turning shaft held in a housing so as to be movable in an axial direction;
a ball screw that transmits drive force produced by an electric motor to the turning shaft;
a bearing that supports a nut, which is a component of the ball screw, so as to be rotatable relative to the housing; and
an annular elastic member that includes: a first elastic portion that has a first load characteristic that gently increases a ratio of compression load per a unit compression amount deforming in the axial direction of the turning shaft; and a second elastic portion that has a second load characteristic that keenly increases the ratio in comparison with the first load characteristic, supports a side face of the bearing in the axial direction of the turning shaft across an entire circumference, and is formed of an elastic material,
wherein:
the second elastic portion is an annular member in a circular disk shape in parallel with the side face of the bearing, and includes a flat tip surface that faces the side face of the bearing;
the first elastic portion is an annular member continuously protruding from the tip surface of the second elastic portion toward the side face of the bearing;
a cross-sectional shape of the first elastic portion is in a tapered shape that is tapered toward the side face of the bearing from the tip surface of the second elastic portion;
an outer diameter of the first elastic portion is smaller than an outer diameter of the second elastic portion; and
an internal diameter of the first elastic portion is larger than an internal diameter of the second elastic portion.

2. The vehicle steering device according to claim 1, wherein an inner circumference of the second elastic portion is an inclined surface continuous from an inner circumference of the first elastic portion.

3. The vehicle steering device according to claim 1, wherein a tip surface of the first elastic portion faces the side face of the bearing, and has a circular arc shape in a cross-sectional view.

4. The vehicle steering device according to claim 1, further comprising an annular collar that is provided between the housing and the elastic member in the axial direction of the turning shaft,
wherein the elastic member is formed integrally with the collar.

5. The vehicle steering device according to claim 4, wherein:
- the collar includes an annular recess in a tip surface that faces the side face of the bearing;
- the second elastic portion is fitted in the recess;
- the internal diameter of the second elastic portion is consistent with an internal diameter of the collar; and
- the tip surface of the second elastic portion protrudes toward the side face beyond the tip surface of the collar.

* * * * *